United States Patent [19]

Lucas

[11] Patent Number: 4,503,209

[45] Date of Patent: Mar. 5, 1985

[54] ACETAMIDE SCAVENGERS FOR RTV SILICONE RUBBER COMPOSITIONS

[75] Inventor: Gary M. Lucas, Scotia, N.Y.

[73] Assignee: General Electric Company, Waterford, N.Y.

[21] Appl. No.: 464,443

[22] Filed: Feb. 7, 1983

[51] Int. Cl.³ .................... C08G 77/06; C08G 77/04
[52] U.S. Cl. ........................................ 528/18; 528/15; 528/17; 528/19; 528/21; 528/32; 528/33; 528/34; 528/901
[58] Field of Search ............... 528/901, 18, 34, 15, 528/17, 21, 19, 32, 33

[56] References Cited

U.S. PATENT DOCUMENTS

| | | | |
|---|---|---|---|
| 3,364,160 | 1/1968 | Golitz | 260/18 |
| 3,378,520 | 4/1968 | Sattlegger et al. | 260/46.5 |
| 3,471,434 | 10/1969 | Pande et al. | 260/37 |
| 3,549,590 | 11/1970 | Holdstock et al. | 260/46.5 |
| 3,560,492 | 2/1971 | Golitz et al. | 260/46.5 |
| 3,622,529 | 11/1971 | Evans | 260/18 S |
| 3,796,686 | 3/1974 | Golitz et al. | 260/46.5 G |
| 3,826,782 | 7/1974 | Lengnick | 260/46.5 E |
| 3,829,529 | 8/1974 | Lengnick | 260/827 |
| 3,839,386 | 10/1974 | Lengnick | 260/448.2 N |
| 3,933,729 | 1/1976 | Letoffe | 260/37 SB |
| 3,983,265 | 9/1976 | Letoffe | 427/58 |
| 4,180,642 | 12/1979 | Takago | 528/32 |
| 4,248,993 | 2/1981 | Takago | 528/38 |
| 4,267,297 | 5/1981 | Hanada et al. | 528/18 |
| 4,395,507 | 7/1983 | Dziark | 528/18 |
| 4,395,526 | 7/1983 | White et al. | 528/34 |
| 4,410,677 | 10/1983 | Lampe | 528/18 |
| 4,424,157 | 1/1984 | Chung | 528/34 |

*Primary Examiner*—Herbert J. Lilling

[57] ABSTRACT

The present invention relates to an alkoxy-functional one-component RTV silicone rubber composition having novel integrated cross-linker, scavenging compounds therein. The integrated cross-linker, scavenger compounds comprise acetamido functional siloxanes.

32 Claims, No Drawings

ACETAMIDE SCAVENGERS FOR RTV SILICONE RUBBER COMPOSITIONS

BACKGROUND OF THE INVENTION

The present invention relates to alkoxy-functional one-component RTV silicone rubber compositions and more particularly, the present invention relates to alkoxy-functional one-component RTV silicone rubber compositions having therein novel scavengers and novel integrated cross-linker, scavenger compounds.

The earliest one-component RTV silicone rubber compositions were acyloxy-functional; see for instance, Bruner, U.S. Pat. No. 3,035,016 and Ceyzeriat, U.S. Pat. No. 3,133,891. These compositions in a simple form, comprise a silanol end-stopped diorganopolysiloxane polymer, an acetoxy-functional cross-linking agent and a condensation catalyst. It was disclosed in subsequent patents that various other ingredients could be incorporated into such compositions, such as, for instance, fillers, plasticizers, adhesion promoters and so forth. As work progressed in the area, various other RTV silicone rubber compositions (RTV in this application shall refer to room-temperature vulcanizable) with different functionalities were developed. Thus, ketoxime-functional, amine-functional, aminoxy-functional and alkoxy-functional, one-component RTV silicone rubber compositions were developed. For amine-functional RTV silicone rubber compositions, see for instance, Nitzsche, et al, U.S. Pat. No. 3,032,528. An alkoxy-functional one-component RTV silicone rubber composition is to be found in Beers, U.S. Pat. No. 4,100,129.

Acetamide silyl compounds were also developed as can be seen in the disclosure of Klebe, U.S. Pat. No. 3,488,371. In the continuation of such development there were developed amide-functional one-component RTV silicone rubber compositions as can be seen from the disclosure of Golitz, U.S. Pat. No. 3,417,047. Other disclosures in this area are, for instance, Toporcer, U.S. Pat. Nos. 3,776,934 and 3,776,933.

There were also some disclosures in the area of the use of acetamide or diacetamide-functional silanes as chain extenders in one-component RTV silicone rubber compositions having various functionalities as can be seen from the disclosure of U.S. Pat. No. 4,020,044 and U.S. Pat. No. 3,817,909. Recently, there have been further developments in the area, for instance, see the disclosures of Mitchell, et al, U.S. Pat. No. 4,252,977 and Beers, U.S. Pat. No. 4,323,489 which disclose the production of novel acetamide silane compounds and the use of such novel acetamide compounds as chain extenders in the production of aminoxy and ketoxime-functional one-component RTV silicone rubber compositions. It was stated in these latter patents and particularly, U.S. Pat. No. 4,323,489 that as a result of the use of an acetamide chain-extender silane compound, there resulted an extremely low-modulus one-component RTV silicone rubber composition.

As stated previously, alkoxy-functional onecomponent RTV silicone rubber compositions were also developed, as can be seen by the disclosure of Beers, U.S. Pat. No. 4,100,129. Generally, such compositions comprise an alkoxy-functional silane as a cross-linking agent, a silanol-terminated diorganopolysiloxane base polymer and a titanium chelate catalyst as the condensation catalyst. These compositions had various advantages such as, that they were essentially non-corrosive; that is, they gave off substantially non-corrosive by-products and did not give off a pungent odor as did some of the other compositions. They were also relatively inexpensive to produce as compared to some of the other RTV compositions disclosed above. However, these compositions had disadvantages in that they did not have as fast a cure-rate as would be desirable and did not have very good shelf-stability. By shelf-stability, it is meant that the composition after being stored for periods of time of 6 months or more, would tend to cure slowly or in some cases, not at all. It was hypothesized that such degradation in the shelf-stability of the composition or the cure rate of the composition resulted from the fact that the moisture in the composition and even slight amounts of moisture or unbonded hydroxy groups would attack the alkoxy-groups in the base polymers, hydrolyzing them and replacing the polyalkoxy groups with mono-alkoxy groups. Such monoalkoxy endcapped diorganopolysiloxane polymers when they were cured by being exposed to atmospheric moisture, would react very slowly, if at all. As can be imagined, this resulted in a slow-curing composition. The longer the composition was stored prior to use after manufacture, the greater was the likelihood that a large amount of mono-alkoxy groups would be formed via hydrolysis by unbonded hydroxy groups; and thus, the greater was the likelihood that the composition would have an unsatisfactory cure rate. As a matter of fact, tests seem to indicate that the shelf-stability or the cure rate of such compositions were affected even after periods of storage as small as two weeks; see White et al, U.S. Pat. No. 4,395,526. Various attempts were made to improve the shelf-stability of the Beers, U.S. Pat. No. 4,100,129, composition with varying degrees of success.

It was the invention of White, et al, U.S. Pat. No. 4,395,526, to utilize novel scavengers and novel integrated cross-linker, scavengers in such alkoxy-functional one-component RTV silicone rubber compositions such as to react with unbonded hydroxy groups so as to tie up such hydroxy groups so that the unbonded hydroxy groups would not react with the alkoxy groups in the terminal positions of the base polymers in the compositions and thus, degrade them. It is disclosed in White, et al, U.S. Pat. No. 4,395,526, that these scavenging, leaving groups can be various types of acetamide-functional hydrolyzable leaving groups. Other types of acetamide-functional compounds useful as scavengers and integrated cross-linker, scavengers is further disclosed in Chung, U.S. Pat. No. 4,424,157.

It is now the purpose of the present application to disclose further acetamide functional silanes and siloxanes which can be used as integrated cross-linker, scavengers and scavengers in alkoxy-functional one-component RTV silicone rubber compositions so that such compositions can be shelf-stable and have a sufficiently rapid cure rate.

It is one object of the present invention to provide for shelf-stable fast-curing alkoxy-functional one-component RTV silicone rubber compositions having novel integrated cross-linker and scavenger compounds therein.

It is another object of the present invention to provide for shelf-stable one-component alkoxy-functional RTV silicone rubber compositions having novel acetamide functional integrated cross-linker, scavengers therein.

It is yet an additional object of the invention to provide for an alkoxy-functional one-component RTV silicone rubber composition having novel acetamide functional silanes and siloxanes as integrated cross-linkers and scavengers therein.

It is yet a further object of the present invention to provide a process for producing alkoxy-functional one-component RTV silicone rubber composition having novel integrated cross-linker scavengers and scavenger compounds therein.

These and other objects of the present invention are accomplished by the disclosure below.

SUMMARY OF THE INVENTION

In accordance with the above objects there is provided by the present invention, a shelf-stable, fast-curing one-component RTV silicone rubber composition comprising, (A) an organopolysiloxane base polymer having a viscosity varying in the range of 100 to 1,000,000 centipoise at 25° C. where the organo group is a monovalent hydrocarbon radical wherein in said base polymer, the terminal silicon atoms in the polymer chain have bonded to them at least one alkoxy group;

(i) a siloxane scavenging compound of the formula,

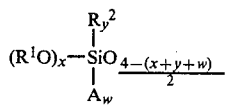

where $R^1$ and $R^2$ are each individually selected from $C_{1-13}$ monovalent hydrocarbon radicals; $R^3$ is selected from the class consisting of hydrogen and $C_{1-8}$ monovalent hydrocarbon radicals; $R^4$ is a $C_{1-8}$ monovalent hydrocarbon radical; and A is a radical selected from the class of radicals of the formula,

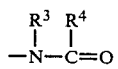

and radicals of the formula,

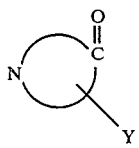

where Y is a radical of the formula,

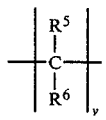

where $R^5$, $R^6$ are individually selected from the class consisting of hydrogen, a $C_{1-13}$ alkyl, alkaryl, alkylester, alkylether, aryl, alkenyl and aralkyl radicals; v is a whole number that varies from 2 to 8; and x has a value that varies from 0.00 to 2.50; y has a value that varies from 0.00 to 2.50; and w has a value that varies from 0.05 to 1.5; and the sum of $x+Y+w$ varies from 2.1 to 3.00.

As noted in the above composition, there is an alkoxy-terminated base polymer and the foregoing acetamide siloxane is present as purely a scavenging compound to react with unbonded hydroxy groups so as to preserve the cure rate and the shelf-stability of the base polymer and thus, the composition. The acetamide groups in the siloxanes react with unbonded hydroxy groups in the composition so as to tie them up and prevent them from degrading the alkoxy groups in the base polymer. In another embodiment of the instant invention, there is utilized an integrated cross-linker, scavenger compound having at least one acetamide-functional leaving group therein which acetamide-functional leaving group reacts with the silanol group or the silanol-terminated diorganopolysiloxane polymer so as to terminate the polymer with the siloxane having the foregoing acetamide hydrolyzable leaving group. It is possible in this manner to produce rapidly an alkoxy-terminated diorganopolysiloxane base polymer.

The advantage of such an acetamide-functional integrated cross-linker, scavenger compound is that it reacts very rapidly with the silanol groups and as such can be utilized in the continuous production of such alkoxy-functional RTV silicone rubber compositions of the White, et al, U.S. Pat. No. 4,395,526; as, for instance, in a devolatilizing extruder as disclosed in Chung, et al, Ser. No. 437,895. The by-products of the reaction of such acetamide-functional integrated cross-linker, scavengers are solids.

The integrated cross-linker, scavenger can have only one acetamide-functional group therein. Accordingly, by the above means, it is possible to produce alkoxy-functional one-component RTV silicone rubber compositions which are shelf-stable and have a rapid cure rate. Another point should be made; in all such compositions there should be a condensation catalyst and preferably a tin condensation catalyst. If there is no such condensation catalyst present in the composition in an effective amount, then the composition will not cure at a sufficiently rapid rate and will not have the consistency and the end properties of a silicone elastomer when it has cured to its maximum consistency. Rather, without such condensation catalysts therein, the composition will cure slowly and when its final consistency is reached it will probably have the physical end properties of a cheesy mass. Accordingly, it is not only highly desirable, but it is necessary that in such compositions a metal condensation catalyst be utilized to cure the base alkoxy-terminated polymers to a silicone elastomer.

DESCRIPTION OF THE PREFERRED EMBODIMENT

In the foregoing formulas, $R^1$ and $R^2$ are each individually selected from the class consisting of $C_{1-13}$ monovalent hydrocarbon radicals such as, for instance, alkyl radicals of 1–13 carbon atoms such as methyl, ethyl, propyl, etc.; cycloalkyl radicals such as cyclohexyl, cycloheptyl, etc; mononuclear radicals such as phenyl, methylphenyl, ethylphenyl, etc.; alkenyl radicals such as vinyl, allyl, etc.; and halogenated substituted monovalent hydrocarbon radicals such as fluoroalkyl radicals 3, 3, 3-trifluoropropyl. Additional radicals which $R^2$ may be selected from are alkylketone radicals such as methylethylketone, methylpropylketone, etc; alkylester radicals such as methylacetate, ethylacetate, etc; and alkylether radicals such as methylethylether and methylmonylether, etc.

The above defined radicals are only exemplary radicals which may fall within the broad definition of the $R^1$ and $R^2$ radicals. Most preferably, $R^1$ and $R^2$ are selected from methyl. Further, the $R^3$ is defined as being selected from the class consisting of hydrogen and $C_{1-8}$ monovalent hydrocarobn radicals which can be any of the above radicals given previously with the distinction that the carbon atoms in the hydrocarbon radical varies from 1–8 carbon atoms. The $R^4$ radicals can be the same radicals as the $R^1$ and $R^2$ radicals, with the further prescription that the foregoing radicals are limited to ones having 1–8 carbon atoms. Most preferably, $R^4$ is methyl or ethyl and $R^3$ is hydrogen or methyl.

It should be noted that the compounds of Formula (1) within the scope of the above definition can be both integrated cross-linker, scavengers or just scavenging compounds.

The siloxane acetamide of Formula (1) has broadly defined acetamide groups. It should be noted that in the compounds of Formula (1), $R^5$ and $R^6$ are each individually selected from $C_{1-8}$ monovalent hydrocarbon radicals which can be selected and are selected from the same monovalent hydrocarbon radicals as $R^3$ and $R^4$. Please note that $R^1$, $R^2$, $R^3$, $R^4$, $R^5$, $R^6$, can be the same or different in the same siloxane compound of Formula (1); and the formulas below.

The siloxane of Formula (1) preferably has from 2 to 20 silicon atoms in it and more preferably has from 2 to 10 silicon atoms in it; such as, a disiloxane, trisiloxane, tetrasiloxane and so forth. Within the broad ranges of the values given above for x, y and w for Formula (1), the preferred ranges when the compound is used as an integrated cross-linker will be defined below. It is also preferable in the compound of Formula (1) that the (A) groups be on the terminal silicon atoms but this is not necessarily required. The only point that has to be made with respect to the siloxanes of Formula (1) is that when too many (A) groups are appended to silicon atoms in the silicone chain, then there will be excessive coupling and cross-linking taking place, both in the cured and uncured compositions. Accordingly, and as such, even though a small amount of the (A) groups can be tolerated in the polymer chain, it is desirable that most of the (A) groups be on the terminal silicon atoms of the siloxane polymers of Formula (1). Further, when the compounds of Formula (1) are to be used solely as integrated cross-linker, scavengers there should be only one (A) group on the terminal silicon atom in the siloxane polymers of Formula (1). Further for ease of reaction and so as to keep the viscosity of the uncured composition to as low a level as possible prior to cure, it is desired that the siloxanes of Formula (1) be linear compounds.

The compounds of Formula (1) when used solely as scavengers are added to the polyalkoxy-terminated base polymer after it has been formed so as to scavenge any free hydroxy groups that are present in the composition or become incorporated into the composition as a result of the addition of various ingredients into the composition, such as fillers, adhesion promoters, and so forth. Accordingly, a cross-linking agent must be reacted with a silanol-terminated polymer to produce a polyalkoxy-terminated polymer whereupon then the scavenging compound is added to it; that is, of Formula (1). In an alternate embodiment, a silanol-terminated diorganopolysiloxane polymer having a viscosity in the range of 100 to 1,000,000 centipoise at 25° C. where the organo group is a monovalent hydrocarbon radical as will more fully be defined below, can be reacted with an integrated cross-linker, scavenger siloxane compound of of Formula (1) or of the formula,

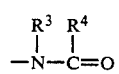

where $R^1$, $R^2$ are as previously defined; and A is a radical selected from the class of radicals of the formula, $$\begin{array}{cc} R^3 & R^4 \\ | & | \\ -N-C=O \end{array}$$

and radicals of the formula,

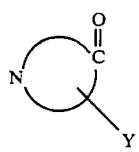

where Y is a radival of the formula,

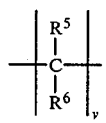

where $R^5$, $R^6$ are each individually selected from the class consisting of hydrogen, a $C_{1-12}$ alkyl, alkaryl, alkylester, alkylether, aryl, alkenyl and an aralkyl radical; v is a whole number that varies from 2 to 8; where $R^3$, $R^4$, are as previously defined and m has a value that varies from 0.15 to 2.50; n has a value that varies from 0.1 to 1.9; o has a value that varies from 0.05 to 2.00; and the sum of m+n+o varies from 2.10 to 3.00; which forms with the silanol-terminated polymer, an alkoxy-terminated polymer; and an effective amount of a condensation catalyst.

In the above Formula (2), $R^1$, $R^2$, $R^3$, $R^4$, $R^5$, $R^6$ and A are defined as previously. The only difference in the definition of the compounds of Formula (2) is in the definition of n and o. Again the same definitions as given with respect to the compounds of Formula (1) hold with respect to the compounds of Formula (2).

The compounds of Formula (2) are preferably integrated cross-linker, scavenger compounds; that is, they can be used purely as scavengers, but they can also be used as integrated cross-linker, scavengers wherein they will function to end-cap the silanol-terminated diorganopolysiloxane base polymer as defined above with polyalkoxy groups. These polymers form the base polymer species in the one-component RTV silicone rubber composition of the present invention. It should also be noted that the compounds of Formula (2) comes within the definition of the compounds of the siloxanes of Formula (1); that is, the formulas of the compounds of Formula (1) are broader formulas which cover both scavenging compounds and integrated cross-linker, scavengers. The compounds of Formula (2) are preferably used as integrated cross-linker, scavenger compounds as well as scavengers.

The base polymers are formed by reacting a silanol-terminated diorganopolysiloxane polymer of the foregoing definition with the compounds of Formula (2).

These polymers may be monoalkoxy-terminated diorganopolysiloxane polymer or a polyalkoxy-terminated diorganopolysiloxane base polymer. If the polymer is a monoalkoxy-terminated diorganopolysiloxane polymer, then, as set forth in Lucas, Ser. No. 449,105, it can be present in the composition up to 50 parts by weight or up to 50 percent by weight of the base polymer composition, wherein the other 50 percent of the base polymer composition comprises polyalkoxy-terminated base polymers or one of the polymers set forth in that foregoing patent application. Such a polymer may be one having hydrolyzable leaving groups in the terminal silicon atoms as defined in Lucas, Ser. No. 449,105, which in connection with the present invention may include acetamide-functional hydrolyzable leaving groups as given above for the definition of A; such as, for instance, the polymers of Formula (4).

The end-capped polymer formed from the integrated cross-linker, scavenger of Formula (2) is simply formed by reacting or placing together the compounds of Formula (2) with a silanol-terminated diorganopolysiloxane polymer. No heating is desired, although heating can be used and no catalyst is necessary since the acetamide functions as its own catalyst; that is, the reaction is autocatalytic and is very rapid.

With respect to the silanol-terminated diorganopolysiloxane polymer, it preferably has the formula,

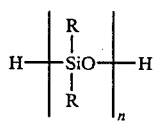 (3)

where each R is individually selected from $C_{1-13}$ monovalent hydrocarbon radicals and n is a whole number that varies from 50 to 2,500 and more preferably varies from 200 to 2,000. Preferably the viscosity of the silanol-terminated diorganopolysiloxane polymer varies from 1,000 to 250,000 centipoise at 25° C. The R radical as defined can be the same substituted groups as given for the $R^1$, $R^2$ radicals as given above and is more preferably selected from methyl or a mixture of a major amount of methyl and a minor amount of phenyl, cyanoethyl, trifluoropropyl, vinyl and mixtures thereof.

Additionally, the polymeric silanol-terminated Polymer of Formula (3) can have silanol or alkoxy groups or other functional groups in the polymer chain; that is, a small amount of such groups can be tolerated in the polymer chain. However, it is undesirable to have such functional groups in too large a number in the polymer chain since they will unduly cross-link the polymer and result in undesirable properties; perhaps an unduly increased viscosity in the uncured composition and certain undesirable physical properties in the cured silicone elastomer that is formed from the composition. Further, the silanol-terminated diorganopolysiloxane polymer of Formula (5) can be a blend of polymer species having a viscosity in the range shown above or can be a blend of various polymer species having different viscosities. It is only necessary that the final blend be within the ranges indicated above.

Further, the base polymer of Formula (3) can be slightly chain-branched; that is, a certain amount of chain-brancing can be tolerated in the polymer. Most preferably the base polymer is as linear as possible since such a base polymer results in the best physical properties in the cured elastomer that is formed therefrom. Proceeding with the end-capping reaction with the compounds of Formulas (1) and (2), there can be produced various RTV silicone rubber compositions. In the reaction of the polymers of Formula (2) with the silanol-terminated diorganopolysiloxane polymer of Formula (3) there is generally prepared a polyalkoxy-terminated polymer of the formula,

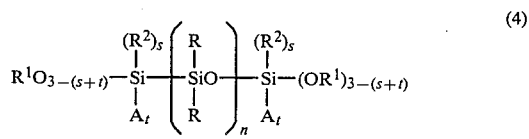 (4)

where R, $R^1$ and $R^2$ are each individually selected from $C_{1-13}$ monovalent hydrocarbon radicals and R, $R^1$, $R^2$ are as defined previously; s is a whole number equal to 0 or 1; t is a whole number that is equal to 1 or 2 and the sum of s+t is equal to 1 to 2 and A is defined as with respect to Formula (1) and (2). There may be also incorporated into such base polymer of Formula (4) in any porportion an alkoxy-terminated polymer which may have one or more alkoxy-groups in the terminal silicon atom and which has the formula,

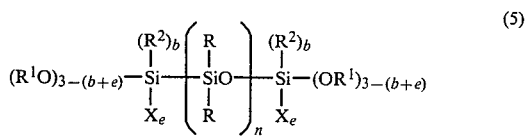 (5)

where R, $R^1$, $R^2$ are each individually selected from $C_{1-13}$ monovalent hydrocarbon radicals; b is a whole number equal to 0 or 1; e is a whole number which equals to 0 or 1, inclusive; the sum of b+e is equal to 0 to 1; and X is a hydrolyzable leaving group selected from the class consisting of amino siloxane, amido siloxane, silazanyl, amino, carbamato, enoxy, imidato, isocyanato, oximato, thioisocyanato, ureido radicals and radicals of the formula,

and radicals of the formula,

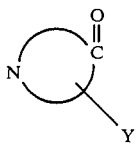

where Y is a radical of the formula,

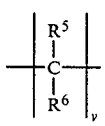

where $R^5$, $R^6$ are individually selected from the class consisting of hydrogen, a $C_{1-12}$ alkyl, alkaryl, alkylester, alkylether, aryl, alkenyl and aralkyl radical, v is a whole number that varies from 2 to 8; where $R^3$ is selected from the class consisting of hydrogen and $C_{1-8}$ monovalent hydrocarbon radicals; $R^4$ is selected from $C_{1-8}$ monovalent hydrocarbon radicals.

In the foregoing formulas (4) and (5), R, $R^1$, $R^2$, $R^3$, $R^4$, $R^5$, $R^6$ are as defined previously. Such polymers of Formula (5) may be incorporated in any proportions with the polymers of Formula (4) or a monoalkoxy-terminated diorganopolysilocane base polymer or any other polyalkoxy-terminated diorganopolysiloxane base polymer. Such polymers of Formulas (4) and (5) are produced by reacting integrated cross-linker, scavengers of Formulas (1) and (2) within the silanol polymer of Formula (3) so that there results the polymers of Formulas (4) and (5) which may have hydrolyzable leaving groups on the terminal silicon atoms of the base polymer. Again, through the process of end-capping, there may be present some X-hydrolyzable leaving groups in the polymer chain. This would result from the reaction of the silanol groups in the polymer chain of the silanol-terminated diorganopolysiloxane polymer of Formula (3) with an integrated cross-linker, scavenger so as to substitute such integrated cross-linker, scavenger moity for the silanol group in the polymer chain.

Further, as stated previously it is desired both in the compounds of Formulas (4) and (5) that there be as little of those moity groups in the polymer chain as possible which can be either alkoxy-containing moities or integrated cross-linker, scavenger moities. It should be noted that in producing an alkoxy-terminated diorganopolysiloxane base polymer within the scope of the instant invention for forming an alkoxy-functional one-component RTV system, it is preferred that the polymer be that of Formula (5) and the integrated cross-linker, scavenger be that of Formulas (1) or (2). However, more broadly, an acceptable RTV composition can be produced by using an integrated cross-linker, scavenger within the scope of Formulas (1) and (2) in which the integrated cross-linker, scavenger may leave an acetamide hydrolyzable leaving group within the scope of the above definitions on the terminal silicon atoms and to some extent even in the polymer chain as explained above, so as to produce the polymer of Formula (4). This polymer, which is as desirable as the polymer of Formula (5), will cure to an RTV silicone elastomer. The foregoing polymer of Formula (5) is formed the same as the polymer of Formula (4); that is, the integrated cross-linker, scavenger is simply added to the silanol-terminated diorganopolysiloxane polymer of Formula (3) and allowed to react with or without the presence of heat. The reaction is autocatalytic.

When the compounds of Formula (1) or (2) are used solely as a scavenger compound, it is desirable that there be present in a concentration of anywhere from 0.5 to 10 parts by weight per 100 parts of the base alkoxy-terminated diorganopolysiloxane polymer. In determining what level of scavenger of Formula (1) or (2) to use in the practice of the invention, the total hydroxy-functionality of the RTV composition can be estimated. The total hydroxy-functionality of the polymer can be determined by infrared analysis. In order to insure that an effective or stabilizing amount of scavenger is used to maintain the stability of the composition over an extended shelf period of six months or more at ambient temperature while in a sealed container, there can be used an additional amount of scavenger over that amount required to endstop the polymer. This excess of scavenger can be up to about 3 percent by weight, based on the weight of the polymer. The aforementioned 3 percent of scavenger by weight exceeds that amount required to substantially eliminate available hydroxy-functionality in the polymer as a result of reaction between OH functionality and X radicals. In compositions which also contain filler and other additives, the additional amount of scavenger of Formulas (1) or (2) which is required is estimated by running a 48-hour stability check at 100° C. to determine whether the tack-free time remains substantially unchanged as compared to the tack-free time of the composition before aging, measured under substantially the same conditions.

It should be noted that the polymers of Formula (5) can be added in any proportions to the polymers of Formula (4) to produce a base alkoxy-terminated diorganopolysiloxane composition, which polymers of Formula (4) can be either monoalkoxy-terminated diorganopolysiloxane polymers or polyalkoxy-terminated diorganopolysiloxane polymers. The only point that is necessary to be made here as was made above, is that in an all alkoxy system; that is, where the base polymers do not have any hydrolyzable leaving groups other than alkoxy, it is necessary in the base polymer composition that there be at least 50 percent by weight of a polyalkoxy-terminated diorganopolysiloxane base polymer, otherwise the cured composition will not have properties generally associated with silicone elastomers.

Another necessary ingredient is a condensation catalyst. Without a condensation catalyst and preferably a tin condensation catalyst, the composition will not cure at the rate of or to the consistency of or end physical properties of a one-component alkoxy-functional RTV silicone rubber composition.

Effective amounts of the condensation catalysts which can be used in the practice of the present invention to facilitate the cure of the RTV compositions are, for example, 0.001 to 1 part based on the weight of 100 parts of the silanol-terminated polydiorganosiloxane of Formula 1. There are included tin compounds, for example, dibutyltindilaurate; dibutyltindiacetate; dibutyltindimethoxide; carbomethoxyphenyl tin trisuberate; tin octoate; isobutyl tin triceroate; dimethyl tin dibutyrate; dimethyl tin di-neodeconoate; triethyl tin tartrate; dibutyl tin dibenzoate; tin oleate; tin naphthenate; butyltin-tri-2-ethylhexoate; tinbutyrate. The preferred condensation catalysts are tin compounds and dibutyltindiacetate is particularly preferred.

Titanium compounds which can be used are, for example, 1, 3-propanedioxytitanium bis (ethylacetoacetate); 1, 3-propanedioxytitanium bis (acetylacetonate); titanium naphthenate; tetrabutyltitanate; tetra2-ethylhexyltitanate; tetraphenyltitanate; tetraoctadecyltitanate; ethyltriethanolaminetitanate. In addition, beta-dicarbonyltitanium compounds as shown by Weyenberg, U.S. Pat. No. 3,334,067 can be used as condensation catalysts in the present invention.

Zirconium compounds, for example, zirconium octoate, also can be used.

Further examples of metal condensation catalysts are, for example, lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate, zinc stearate.

Examples of non-metal condensation catalysts are hexylammonium acetate and benzyltrimethylammonium acetate.

Various fillers and pigments can be incorporated in the silanol or alkoxy-terminated organopolysiloxane, such as, for example, titanium dioxide, zirconium silicate, silica aerogel, iron oxide, diatomaceous earth, fumed silica, carbon black, precipitated silica, glass fibers, polyvinyl chloride, ground quartz, calcium carbonate, etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, from 10 to 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler which can include up to about 35–50 parts of a reinforcing filler, such as fumed silica filler, per 100 parts of silanol-terminated organopolysiloxane is utilized. Besides condensation catalysts and fillers, there may be added other ingredients to the uncured RTV composition to give it desirable properties, such as, for instance, adhesion promoters.

There may also be present in the composition from 0.5 to 10 parts by weight per 100 parts of the base alkoxy-terminated polymer of adhesion promoters such as that defined in Lucas, Ser. No. 349,538, and Beers, Ser. No. 349,537. All the patents and patent applications referred to in this application are hereby incorporated by reference. There may also be added plasticizers, sag control additives and other additives to the composition as defined in Beers, Ser. No. 349,537. In addition, in the composition there may be present excessive amounts of a polyalkoxy cross-linking agent of the formula, $$(R^1O)_{4-b}-Si(R^2)_b \quad (6)$$

where $R^1$ and $R^2$ are individually selected from $C_{1-13}$ monovalent hydrocarbon radicals and b is a whole number equal to 0 or 1. $R^1$ and $R^2$ may be selected from the same radicals as defined for these radicals previously.

The excess cross-linking agent of Formula (6) given above may be utilized in the composition for the same reasons as given previously with respect to the same cross-linking agent in White, et al, U.S. Pat. No. 4,395,526. The excess cross-linking agent for Formula (6) acts to retard degradation of the alkoxy-groups in the terminal silicone atoms of the base diorganopolysiloxane polymers and in general enhances the cross-linking of the base polymers on the terminal silicone atoms.

In addition, there may be present in the composition curing accelerators. Curing accelerators which can be used in the practice of the invention are silyl substituted guanidines having the formula, $$(Z)_g Si(OR^1)_{4-g}, \quad (7)$$

where $R^1$ is as previously defined, Z is a guanidine radical of the formula,

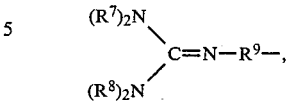

$R^9$ is divalent $C_{2-8}$ alkylene radical, $R^7$ and $R^8$ are selected from hydrogen and $C_{1-8}$ alkyl radicals and g is an integer equal to 1 to 3 inclusive. In addition, alkyl substituted guanidines having the formula,

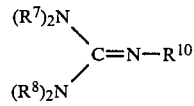

where $R^7$ and $R^8$ are as previously defined and $R^{10}$ is a $C_{1-8}$ alkyl radical, also can be employed. Some of the silyl substituted guanidines included within Formula (7) are shown by Takago, U.S. Pat. Nos. 4,180,642 and 4,248,993.

In addition to the above substituted guanidines, there can be used various amines, for example, di-n-hexylamine, cyclohexylamine, di-n-octylamine, hexamethoxymethylmelamine, and silylated amines, for example γ-aminopropyltrimethoxysilane and methyldimethoxy-di-n-hexylaminosilane. Methyldimethoxy-di-n-hexylaminosilane acts as both a scavenger and curing accelerator. The primary amines, secondary amines, silylated secondary amines are preferred, and secondary amines and silylated secondary amines are particularly preferred. Silylated secondary amines such as alkyldialkoxy-n-dialkylaminosilanes and guanidines such as alkyldialkoxyalkylguanidylsilanes which are useful as cure accelerators herein also act as scavengers and, in certain instances, as stabilizers in the compositions of this invention.

The preferred excess cross-linking agent of Formula (6) is methyltrimethoxysilane and the preferred tin condensation catalysts are dibutyltindiacetate and dibutyltindilaurate. The preferred curing accelerator is di-n-hexylamine and di-n-butylamine. The cure rate accelerator may be used in various amounts but can be used in the concentration of 0.1 to 5 and about 0.3 to 1 parts by weight per 100 parts of the base alkoxy-terminated diorganopolysiloxane polymer.

The uncured RTV silicone rubber composition may be prepared in various manners. Preferably it is prepared by first forming the alkoxy-terminated diorganopolysiloxane polymer and then adding the scavenger and other ingredients as desired. This may be done continuously, semi-continuously or batch-wise.

A continuous manner or semi-continuous manner of preparing such compositions is to be found in CHUNG, et al, Ser. No. 437,895. It should be remembered that the foregoing acetamide scavengers can be used with advantage as scavenging compounds in a continuous process in that they react very quickly. Accordingly, with the integrated crosslinker, scavengers of Formulas (1) or (2), the composition can be prepared continuously in a devolatilizing extruder as defined in the foregoing CHUNG, Ser. No. 437,895, patent application. Although the catalysts defined in CHUNG, et al, Ser. No. 427,930, can be utilized in such a process, they are not necessary.

Of course, it should be noted, such compositions are prepared anhydrously; that is, once the alkoxy-terminated diorganopolysiloxane polymer is formed, then the composition is packaged as such and stored as such. When it is desired to cure the composition, the seal on the package is broken and the composition is exposed to atmospheric moisture whereupon it will cure to a silicone elastomer with complete cure taking place in 24 hours.

The compounds of Formulas (1) and (2) are produced in a manner known in the art.

This is also true of the cyclic amide reactant as defined in the compounds of Formula (2). The silane is the desired alkoxy-functional chlorosilane or alkoxy-functional, if that is the case, chlorosiloxane. Depending upon the number of chlorine groups on the terminal silicon atoms in the polymer chain of the siloxane or on the silane will determine the amount of acetamide groups it is desired to impart or add to the silane or siloxane.

Accordingly, the appropriate chlorosilane, siloxane is reacted in an anhydrous manner with the appropriate acetamide in the presence of, preferably tertiary amine, such as triethylamine, an acid acceptor and a solvent. The reaction can take place any where from 30 minutes to 2 hours and preferably takes place anywhere from 30 minutes to 1 hour. The stochiometric amount of acetamide is used with a slight excess over the amount that is necessary to substitute or react with the chlorine groups in the silane or siloxane.

There may also be utilized in the composition, a solvent such as one of the inert hydrocarbon solvents that are well-known, such as hexane, octane, etc., xylene, toluene, etc. The reaction is slightly exothermic and is preferably carried out at room temperature, but can be carried out at any temperature from room temperature up to 75° C. Sufficient tertiary amine is added to the composition so as to tie up all the chlorine groups that are released as a by-product in the reaction. As a result when the reaction is complete, there is formed a tertiary amine, chloride, precipitate which removed. Then the solvent is distilled off to yield the desired final product. In such reactions as will be illustrated in the examples below, the preferred silane or siloxane amide is obtained in 80 to 90 percent yield. The most important factor in the reaction of producing such compounds of Formulas (1) and (2) is to add a slightly excess amount, that is, 5 to 20 percent excess amount of the acetamide which is desired to be reacted or substituted for the chlorine groups on the silane or siloxane so as to obtain as much of the desired product as possible. The reaction can be carried out under vacuum, room-temperature or even a slight excess of pressure such as 5 to 10 psi over absolute. No real advantage is gained with carrying out the reaction under vacuum or under pressure and is preferably carried out at atmospheric pressure.

It is also desirable that the cross-linking agent be maintained under substantially anhydrous conditions or a nitrogen atmosphere after it has been prepared. This is also true of the reaction product of the crosslinker, scavenger with the silanol-terminated diorganopolysiloxane polymer.

The alkoxy-terminated polymer must be maintained in a substantially anhydrous state during preparation of the RTV composition and until curing of the RTV composition. The silane and siloxane reactants for the above reactions are well-known compounds and the literature will not be referred to as to their preparations.

So are the foregoing acetamides referred to previously. With respect to cyclic amides as integrated cross-linker, scavengers and as scavenging compounds in such composition, one is referred to the patent application of CHUNG, Ser. No. 338,578, filed on Jan. 11, 1982. Accordingly, preferred compounds within the scope of Formula (1) are as follows.

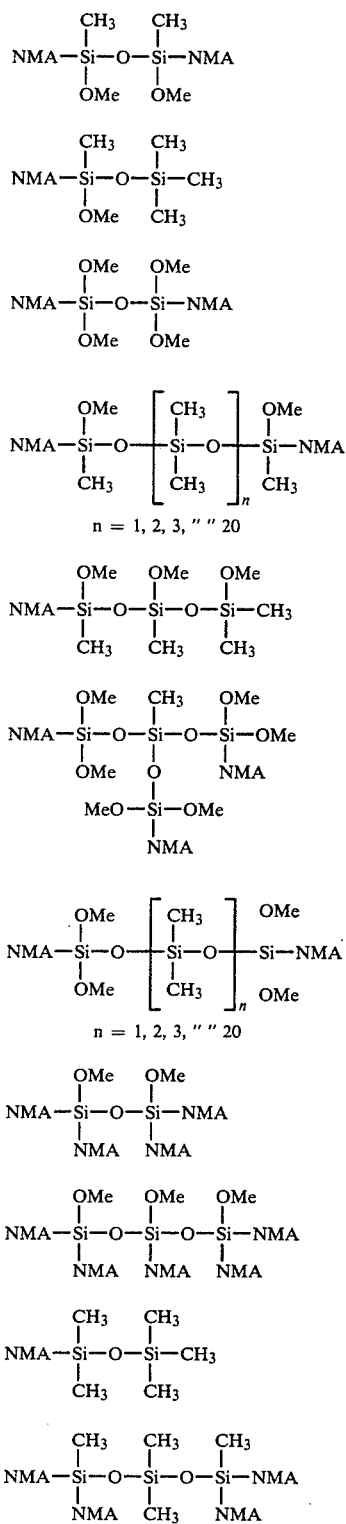

-continued

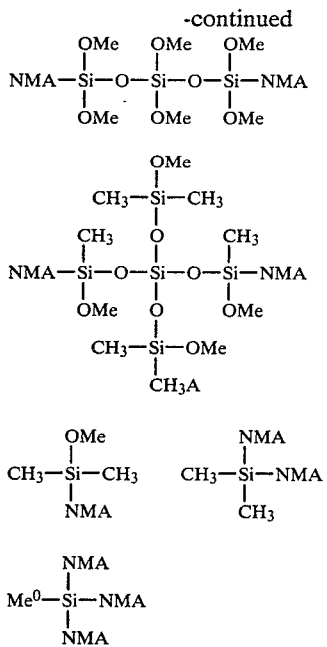

Preferred compounds within the scope of Formula (2) are as follows:

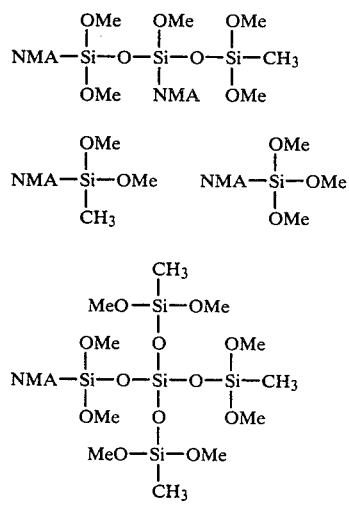

In the examples and formulas in this application, Me stands for methyl, Et stands for ethyl, and NMA stands for N-methyl acetamide. Accordingly, the process for producing the compounds of Formulas (1) and (2) is disclosed above. Such compounds can be utilized to produce alkoxy-functional one-component RTV compositions as disclosed in the present case and as disclosed in the other foregoing cases mentioned above and particularly disclosed in WHITE, et al, U.S. Pat. No. 4,395,526.

The examples below are given for the purpose of illustrating the present invention. They are not given for any purpose of setting limits and boundaries to the invention. All parts are by weight.

EXAMPLE I

Synthesis of $CH_3Si(OCH_3)_2NMA$ (NMA stands for N-methyl acetamide) and Silanol Polymer Endcapping Rate Study A 5-1, 3-neck flask fitted with a mechanical stirrer, pot thermometer, water reflux condenser with $N_2$ inlet port, and two 250 ml pressure equalizing addition funnels, was purged with dry $N_2$ and charged with 2 liters of hexane and 2 moles (280 ml) trimethylamine. One addition funnel was charged with 1.00 mole (140 parts) of $CH_3Si(OCH_3)_2Cl$ and the second addition funnel was charged with 1.10 mole (80.4 parts) of N-methylacetamide. While stirring at room temperature, under a $N_2$ atmosphere, the $CH_3Si(OCH_3)_2Cl$ was rapidly added to the pot mixture. The acetamide was then added dropwise to a rapidly stirring pot mixture over a 30 min. period. A slight exotherm caused the pot temperature to increase from 22° C. to 35° C. Copious amounts of solid, white, triethylamine hydrochloride formed during the course of the reaction. After stirring at room temperature for 15 hr., the solids were removed by vacuum filtration and liquid volatiles were removed via rotary flash evaporation under reduced pressure. Vacuum filtration yielded the desired methyldimethoxy-N-methylacetamidosilane, b.p.68°-72° C./5mm Hg., 90 percent purity by G. C. analysis.

The $CH_3Si(OCH_3)_2NMA$ was then mixed, at various concentrations with/silanol end-stopped dimethylpolysiloxane polymer, of 2,500 to 3,500 centipoise viscosity at 25° C. (Polymer A) under anhydrous conditions using a Semkit ® mixer. One step dasher rod catalyzations were carried out as follows:

TABLE I

| Experiment | Formulation | Mixing Conditions |
|---|---|---|
| A | 100 parts Polymer A<br>2.8 parts $CH_3Si(OCH_3)_2NMA$ | 15 min. mix<br>at R.T. |
| B | 100 parts Polymer A<br>2.0 parts $CH_3Si(OCH_3)_2NMA$ | 15 min. mix<br>at R.T. |
| C | 100 parts Polymer A<br>0.9 parts $CH_3Si(OCH_3)_2NMA$ | 15 min. mix<br>at R.T. |

After mixing, an infrared study was done to determine the rate of polymer endcapping by following the disappearance of the $\equiv$Si—OH bond at 1701 Nanometers. The results are shown in Table II.

TABLE II

| | % Residual $\equiv$Si OH | | |
|---|---|---|---|
| Reaction Time (hr.) | A | B | C |
| .25 | 4 | 21 | 95 |
| .50 | 2 | 16 | 72 |
| 1.0 | 0 | 16 | 55 |
| 1.5 | | 16 | 50 |
| 4.0 | | 16 | 43 |
| 4.5 | | 16 | 42 |

EXAMPLE II $CH_3Si(OCH_3)_2NMA$ RTV composition without Amine Cure Accelerator The integrated cross-linker, scavenger $CH_3Si(OCH_3)_2NMA$ was compounded with polymer, filler, cross-linker, and condensation catalyst, under anhydrous conditions, using a Semkit ® mixer. Single step dasher rod catalyzations were performed as follows:

| Parts | | |
|---|---|---|
| 85 parts | A silanol-terminated dimethyl-siloxane of 2,500 to 3,500 centipoise at 25° C. | 15 min. at room temp. |
| 15 parts | Fumed silica treated with octa-methylcyclotetrasiloxane. | |
| 2.5–3.5 parts | CH$_3$Si(OCH$_3$)$_2$NMA | |
| 0–1.0 parts | CH$_3$Si(OCH$_3$)$_3$ | |
| 0.23 parts | Bu$_2$Sn(OAc)$_2$ | |

After mixing, the RTV compositions were packaged into sealed aluminum tubes and stored 24 hr. at room temperature, 24 hr. at 100° C. prior to exposure to a room temperature, 50% RH curing environment. Speed and degree of cure was determined by Tack Free Time and 1, 2 and 4 day Durometer (Shore A) measurements. The results are given in Table III.

TABLE III

CH$_3$Si(OCH$_3$)$_2$NMA without Amine Accelerator

| CH$_3$Si(OCH$_3$)$_2$NMA Level (Parts) | CH$_3$Si(OCH$_3$)$_3$ Level (Parts) | Age Time, days | Age. Temp. | TFT (min) | Durometer (Shore A) | | |
|---|---|---|---|---|---|---|---|
| | | | | | 1 day | 2 days | 4 days |
| 2.5 parts | 0 parts | 1 | RT | 85 | 14 | 18 | 26 |
| | | 1 | 100° C. | 45 | 11 | 18 | 24 |
| | | 2 | 100° C. | 50 | 20 | 17 | 29 |
| 3.5 parts | 0 parts | 1 | RT | 115 | 13 | 19 | 24 |
| | | 1 | 100° C. | 45 | 14 | 21 | 25 |
| | | 2 | 100° C. | 50 | 23 | 21 | 25 |
| 2.5 parts | 1.0 parts | 1 | RT | 85 | 18 | 22 | 28 |
| | | 1 | 100° C. | 35 | 16 | 18 | 29 |
| | | 2 | 100° C. | 50 | 22 | 26 | 31 |
| 3.5 parts | 1.0 parts | 1 | RT | 85 | 19 | 25 | 30 |
| | | 1 | 100° C. | 35 | 22 | 27 | 33 |
| | | 2 | 100° C. | 50 | 25 | 28 | 31 |

EXAMPLE III

CH$_3$Si(OCH$_3$)$_2$NMA RTV Composition With Amine Accelerator

The procedure of Example II was repeated, except that there was utilized 85 parts of the same silanol-terminated polydimethylsiloxane as Example I, 15 parts of the octamethylcyclotetrasiloxane treated silica filler, 2.8 parts of the methyldimethoxy-N-methylacetamidesilane, 0.4 parts of trimethoxysilylpropyltetramethylguanidine, 2.6 parts of the methyltrimethoxysilane and 0.1 part of dibutyltindimethoxide.

The above room temperature vulcanizable composition was then evaluated for stability and other physical properties after a two-day aging period at room temperature and at 100° C. The results are shown in Table IV.

TABLE IV

| | Shelf Age Time | RT | 100° C. |
|---|---|---|---|
| TFT (min) | 0 days | 44 | — |
| | 1 day | 18 | 18 |
| | 2 days | 18 | 13 |
| Shore A | 2 days | 38 | 40 |
| Tensile (psi) | 2 days | 267 | 235 |
| Elongation (%) | 2 days | 178 | 144 |
| Die "B" Tear | 2 days | 26 | 29 |

EXAMPLE IV

CH$_3$Si(OCH$_3$)$_2$NMA as Hydroxy Scavenger

The dimethoxy-terminated polydimethylsiloxane of Formula (5) was prepared by effecting reaction between 100 parts of the silanol-terminated polydimethylsiloxane of Example I and 30 parts of methyltrimethoxysilane in the presence of 0.65 parts of di-n-hexylamine. The mixture was agitated and heated under dry nitrogen at a temperature of 80° C. for approximately 1 hour and the excess methyltrimethoxysilane was then stripped from the mixture.

Then, RTV compositions were prepared from the above ingredients containing 0, 0.5 and up to 1.5 parts of the methyldimethoxy-N-methylacetamidesilane which was added along with the dibutyltindiacetate to plastic tubes containing the blend of the dimethoxy-terminated polydimethylsiloxane and the treated fumed silica which was formed by mixing the polymer and filler for 2 hours under nitrogen and then stripped under full vacuum prior to injection into the plastic tubes. The following results were obtained, where TFT (minutes) was determined as in Example II and Durometer Hardness (Shore A) of ≧28 indicates a complete cure:

TABLE V

| | TFT (min) | | Durometer | |
|---|---|---|---|---|
| Age (days) | 25° C. | 100° C. | 25° C. | 100° C. |
| 0 Part Scavenging Silane | | | | |
| 0 | 30 | — | — | — |
| 1 | Gelled in Tube | — | — | — |
| 2 | — | — | — | — |
| 0.5 Part Scavenging Silane | | | | |
| 0 | 60 | — | — | — |
| 1 | 60 | 35 | 28 | 30 |
| 2 | Gelled in Tube | — | — | — |
| 1 Part Scavenging Silane | | | | |
| 0 | 50 | — | — | — |
| 1 | 35 | 30 | 34 | 34 |
| 2 | — | 30 | — | 29 |

Additional RTV compositions were prepared containing up to 1.5 parts of the scavenging silane per 100 parts of the RTV composition which exhibited substantially the same tack-free time and cure as shown for the 1 part level.

EXAMPLE V

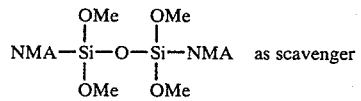

as scavenger

This is a fictitious example.

A suitable, 3-neck flask fitted with a mechanical stirrer, pot thermometer, water reflux condenser with N$_2$ inlet port; and two 250 ml. pressure equalizing addition funnels, is purged with dry N₂ and charged with 4 liters of hexane and 3.5 moles ET₃N. One addition funnel is charged with 0.5 moles of hexachlorodisiloxane and the second is charged with 2 moles anhydrous methanol. While stirring at room temperature under a N₂ atmosphere, the hexachlorodisiloxane is added rapidly to the pot mixture. Methanol is then added dropwise to a rapidly stirring pot mixture over a 30 min. period. A reaction exotherm will cause the pot temperature to increase 10°–20° centigrade. Copious amounts of solid, white tinethylaminehydrochloride forms during the methanolysis. After completing the methanol addition, a third addition funnel is fitted to the pot and charged with 1.1 mole N-methylacetamide. The NMA is added to the rapidly stirring pot mixture dropwise over a 15 min. period. After stirring at room temperature for 15 hours, the solids are removed by vacuum filtration and liquid volatiles are removed via rotary flash evaporation under reduced pressure, leaving a pale yellow, high boiling liquid which is tetramethyoxy-bis-n-methylacetamidodisiloxane.

Tetramethoxy-bis-n-methylacetamidodisiloxane is compounded with polymer, filler, cross-linker, and condensation catalyst, under anhydrous conditions, using a Semkit ® mixer as follows:

85 parts methyldimethoxy end-stopped dimethylpolysiloxane polymer (100-, 200,000 cps at 25° C.).
15 parts fumed silica treated with octamethylcyclosiloxane.
2.0 parts tetramethoxy-bis-N-methylacetamidodisiloxane.
0.5 parts methyltrimethoxysilane
0.4 parts di-N-hexylamine
0.1 parts Bu₂Sn (OAc)₂

After mixing, the RTV compositions are packaged into sealed aluminum tubes and stored 48 hours at room temperature and 100° C. prior to exposure to a room temperature, 50% R.H. curing environment. Speed and degree of cure are determined by Tack Free Time and ASTM physical properties:

| Property | R.T. Age | 48 hr./ 100° C. Ageing |
|---|---|---|
| Tack Free Time, min. | 60 | 60 |
| Shore A, Durometer | 16 | 14 |
| Tensile, psi. | 220 | 200 |
| Elongation, % | 650 | 670 |

We claim:
1. A shelf-stable, fast curing one-component RTV silicone rubber composition, comprising,
(A) an organopolysiloxane polymer having a viscosity varying in the range of 100 to 1,000,000 centipoise at 25° C. where the organo group is a monovalent hydrocarbon radical wherein in said polymer, the terminal silicon atoms in the polymer chain have bonded to them at least one alkoxy group;
(B) an effective amount of a scavenging siloxane compound of the formula,

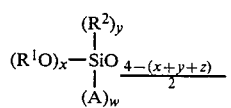

where R¹, R² are each individually selected from C₁₋₁₃ monovalent hydrocarbon radicals; and A is a radical selected from the class consisting of radicals of the formula,

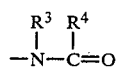

and radicals of the formula,

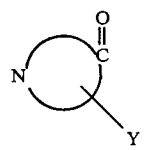

where Y is a radical of the formula,

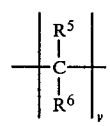

where R⁵, R⁶ are individually selected from the class consisting of hydrogen, a C₁₋₁₂ allyl, alkenyl, alkylester, alkylether, aryl, alkaryl and aralkyl radical, v is a whole number that varies from 2 to 8; R³ is selected from the class consisting of hydrogen and C₁₋₈ monovalent hydrocarbon radicals; R⁴ is a C₁₋₈ monovalent hydrocarbon radical; and x has a value that varies from 0.00 to 2.50; y has a value that varies from 0.00 to 2.50; w has a value that varies from 0.05 to 1.5; and the sum of x+y+w varies from 2.10 to 3.00.

2. The composition of claim wherein the condensation catalyst is a tin condensation catalyst.
3. The composition of claim 2 further comprising having an effective amount of cross-linking silane of the formula,

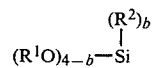

where R¹ and R² are individually selected from C₁₋₁₃ monovalent hydrocarbon radicals and b is a whole number equal to 0 or 1.

4. The composition of claim 3 further containing an effective amount of a cure accelerator selected from the group consisting of substituted guanidines, amines and mixtures thereof.

5. The composition of claim 4 having therein a polyalkoxy-terminated organopolysiloxane polymer of the formula,

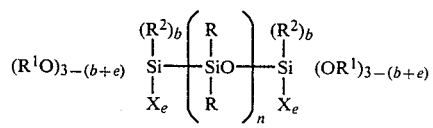

where R, R¹ and R² are each individually selected from C₁₋₁₃ monovalent hydrocarbon radicals; b is a whole number equal to 0 or 1; e is a whole number which equals to 0 or 1, the sum of b+e is equal to 0 to 1; n is an integer having a value of from about 50 to 2,500, inclusive; and X is a hydrolyzable leaving group selected from the class consisting of amino siloxane, amido siloxane, silazanyl, amino, carbamato, enoxy, imidato, isocyanato, oximato, thioisocyanato, ureido radicals and radicals of the formula,

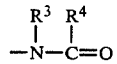

and radicals of the formula,

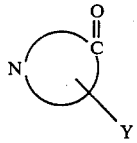

where Y is a radical of the formula,

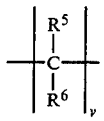

where $R^5$, $R^6$ are individually selected from the class consisting of hydrogen, a $C_{1-12}$ alkyl, alkaryl, alkylester, alkylether, aryl, alkenyl and aralkyl radical, v is a whole number that varies from 2 to 8; $R^3$ is selected from the class consisting of hydrogen and $C_{1-8}$ monovalent hydrocarbon radicals; and $R^4$ is selected from $C_{1-8}$ monovalent hydrocarbon radicals.

6. The composition of claim 5 wherein the crosslinking Si base is methyltrimethoxysilane, the condensation catalyst is selected from the class consisting of dibutyltindiacetate and dibutyltindilaurate, and the curing accelerator is selected from the class consisting of di-n-hexylamine and di-n-butylamine.

7. The composition of claim 5 wherein the condensation catalyst is selected from the class consisting of dibutyltindiacetate and dibutyltindilaurate and the cure accelerator is selected from the class consisting of di-n-hexylamine and di-n-butylamine.

8. The composition of claim 5 wherein R, $R^1$ and $R^2$ are methyl and the tin condensation catalyst is selected from the class consisting of dibutyltindiacetate and dibutyltindilaurate.

9. The composition of claim 8 wherein $R^3$ and $R^4$ are methyl.

10. A shelf-stable, fast-curing one component RTV silicone rubber composition, comprising,
(A) a silanol-terminated diorganopolysiloxane polymer having a viscosity in the range of 100 to 1,000,000 centipoise at 25° C. where the organo group is a monovalent hydrocarbon radical;
(B) an integrated cross-linker, scavenger siloxane compound of the formula,

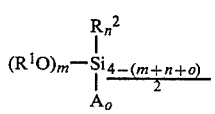

where $R^1$, $R^2$ are each individually selected from $C_{1-13}$ monovalent hydrocarbon radicals; and A is a radical selected from the class of radicals of the formula,

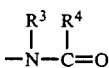

and radicals of the formula,

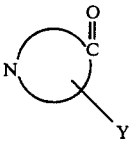

where Y is a radical of the formula,

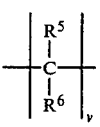

where $R^5$, $R^6$ are individually selected from the class consisting of hydrogen, a $C_{1-12}$ allkyl, alkenyl, alkylester, alkylether, aryl, alkaryl and an aralkyl radical, v is a whole number that varies from 2 to 8; where $R^3$ is selected from the class consisting of hydrogen and $C_{1-8}$ monovalent hydrocarbon radicals; $R^4$ is a $C_{1-8}$ monovalent hydrocarbon radical; m has a value that varies from 0.15 to 2.50; n has a value that varies from 0.1 to 1.9; o has a value that varies from 0.05 to 2.00; and the sum of m+n+o varies from 2.10 to 3.00; which forms with the silanol-terminated polymer, an alkoxy-terminated polymer; and
(C) an effective amount of a condensation catalyst.

11. The composition of claim 10 wherein the silanol-terminated diorganopolysiloxane polymer has the formula,

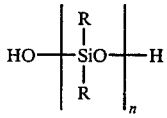

wherein each R is individually selected from $C_{1-13}$ monovalent hydrocarbon radicals and n is a whole number that varies from 50 to 2,500.

12. The composition of claim 10 wherein the alkoxy-terminated polymer that is formed has the formula,

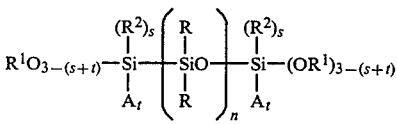

where R, $R^1$ and $R^2$ are each individually selected from $C_{1-13}$ monovalent hydrocarbon radicals; n is a whole number that varies from 50 to 2,500, inclusive; and s is a whole number equal to 0 or 1; t is a whole number equal to 1 or 2, inclusive; and the sum of s+t is equal to 1 to 2, and A is as previously defined.

13. The composition of claim 10 wherein the condensation catalyst is a tin condensation catalyst.

14. The composition of claim 13 further comprising having an effective amount of a cross-linking silane of the formula,

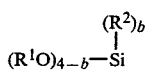

where $R^1$ and $R^2$ are individually selected from $C_{1-13}$ monovalent hydrocarbon radicals; and b is a whole number equal to 0 or 1.

15. The composition of claim 14 further comprising adding an effective amount of a cure accelerator selected from the group consisting of substituted guanidines, amines and mixtures thereof.

16. The composition of claim 15 further comprising having therein a polyalkoxy-terminated organopolysiloxane polymer of the formula,

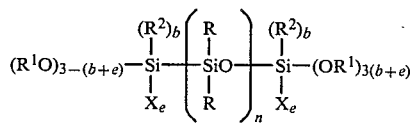

where R, $R^1$, $R^2$ are individually selected from $C_{1-13}$ monovalent hydrocarbon radicals; b is a whole numbers equal to 0 or 1; e is a whole number which equals 0 or 1, inclusive; the sum of b+e is equal to 0 to 1; n is an integer having a value of from about 50 to 2,500, inclusive; and X is a hydrolyzable leaving group selected from the class consisting of amino siloxane, amido siloxane, silazanyl, amino, carbamato, enoxy, imidato, isocyanato, oximato, thioisocyanato, ureido radicals and radicals of the formula,

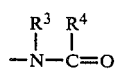

and radicals of the formula,

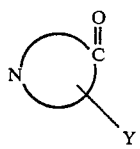

where Y is a radical of the formula,

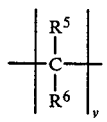

where $R^5$, $R^6$ are individually selected from the class consisting of hydrogen, a $C_{1-12}$ alkyl, alkaryl, alkylester, alkylether, aryl, alkenyl and aralkyl radical, v is a whole number that varies from 2 to 8; $R^3$ is selected from the class consisting of hydrogen and $C_{1-8}$ monovalent hydrocarbon radicals; $R^4$ is selected from $C_{1-8}$ monovalent hydrocarbon radicals.

17. The composition of claim 16 wherein the cross-linking silane is methyltrimethoxy silane, the condensation catalyst is selected from the class consisting of dibutyltindiacetate and dibutyltindilaurate and a curing accelerator selected from the class consisting of di-n-hexylamine and di-n-butylamine.

18. The composition of claim 16 wherein the condensation catalyst is selected from the class consisting of dibutyltindiacetate and dibutyltindilaurate and the cure accelerator is selected from the class consisting of di-n-hexylamine and di-n-butylamine.

19. The composition of claim 16 wherein R, $R^1$ and $R^2$ are methyl and the tin condensation catalyst is selected from the class consisting of dibutyltindiacetate and dibutyltindilaurate.

20. The composition of claim 19 wherein $R^3$ and $R^4$ are methyl.

21. A process for producing a shelf-stable, fast-curing one component RTV silicone rubber composition, comprising, mixing anhydrously, (A) an organopolysiloxane polymer having a viscosity varying in the range of 100 to 1,000,000 centipoise at 25° C. where the organo group is a monovalent hydrocarbon radical wherein in said polymer, the terminal silicon atoms in the polymer chain have bonded to them at least one alkoxy group;

(B) an effective amount of a scavenging compound of the formula,

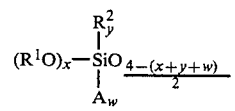

where $R^1$ and $R^2$ are each individually selected from $C_{1-13}$ monovalent hydrocarbon radicals; and A is a radical selected from the class of radicals of the formula,

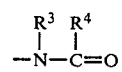

and radicals of the formula,

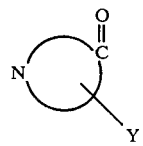

where Y is a radical of the formula,

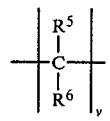

where $R^5$, $R^6$ are individually selected from the class consisting of hydrogen, a $C_{1-12}$ allyl, alkenyl, alkylester, alkylether, aryl, alkaryl and an aralkyl radical, v is a whole number that varies from 2 to 8;

$R^3$ is selected from the class consisting of hydrogen and $C_{1-8}$ monovalent hydrocarbon radials; $R^4$ is a $C_{1-8}$ monovalent hydrocarbon radical; x has a value that varies from 0.00 to 2.50; y has a value that varies from 0.00 to 2.50; w has a value that varies from 0.05 to 1.5; and the sum of x+y+w varies from 2.10 to 3.00.

22. A process for forming a shelf-stable, fast-curing one-component RTV silicone rubber composition comprising mixing in substantially an anhydrous manner,
(A) a silanol-terminated diorganopolysiloxane polymer having a viscosity in the range of 100 to 1,000,000 centipoise at 25° C. where the organo group is a monovalent hydrocarbon radical;
(B) an integrated cross-linker, scavenger siloxane compound of the formula,

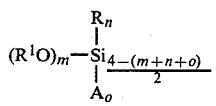

where $R^1$ and $R^2$ are each individually selected from $C_{1-13}$ monovalent hydrocarbon radicals, and A is a radical selected from the class of radicals of the formula,

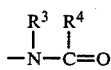

and radicals of the formula,

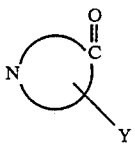

where Y is a radical of the formula,

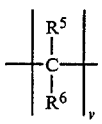

where $R^5$, $R^6$ are individually selected from the class consisting of hydrogen, a $C_{1-12}$ alkyl, alkenyl, alkylester, alkylether, aryl, alkaryl and an aralkyl radical, v is a whole number that varies from 2 to 8; $R^3$ is selected from the class consisting of hydrogen and $C_{1-8}$ monovalent hydrocarbon radicals; $R^4$ is a $C_{1-8}$ monovalent hydrocarbon radical; m has a value that varies from 0.15 to 2.50; n has a value that varies from 0.1 to 1.0; o has a value that varies from 0.05 to 2.00; and the sum of m+n+o varies from 2.0 to 3.00; which forms with the silanol terminated polymer, an alkoxy-terminated polymer; and
(C) an effective amount of a condensation catalyst.

23. The process of claim 22 wherein the silanol-terminated diorganopolysiloxane polymer has the formula,

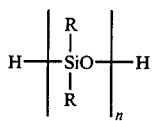

wherein each R is individually selected from $C_{1-13}$ monovalent hydrocarbon radicals and n is a whole number that varies from 50 to 2,500.

24. The process of claim 22 wherein the alkoxy-terminated polymer that is formed has the formula,

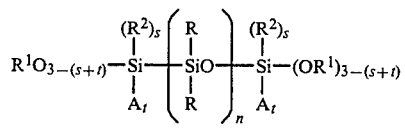

where R, $R^1$ and $R^2$ are each individually selected from $C_{1-13}$ monovalent hydrocarbon radicals; n is an integer that varies from 20 to 2,500, inclusive; s is a whole number equal to 0 or 1; t is a whole number equal to 1 or 2, inclusive; and the sum of s+t is equal to 1 or 2; and A is as previously defined.

25. The process of claim 22 wherein the condensation catalyst is a tin condensation catalyst.

26. The process of claim 25 further comprising adding an effective amount of a cross-linking silane of the formula,

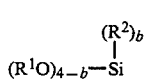

where $R^1$ and $R^2$ are each individually selected from $C_{1-13}$ monovalent hydrocarbon radicals and b is a whole number that is equal to 0 or 1.

27. The process of claim 26 further containing an effective amount of a cure accelerator selected from the group consisting of substituted guanidines, amines and mixtures thereof.

28. The process of claim 27 having therein a polyalkoxy-terminated organopolysiloxane polymer of the formula,

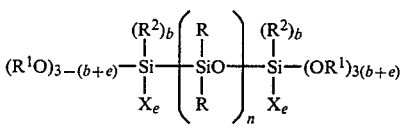

where R, $R^1$, $R^2$ are individually selected from $C_{1-13}$ monovalent hydrocarbon radicals; b is a whole number equal to 0 or 1; e is a whole number which equals to 0 or 1, inclusive; the sum of b+e is equal to 0 to 1; n is an integer having a value of from about 50 to 2,500, inclusive; and X is a hydrolyzable leaving group selected from the class consisting of amino siloxane, amido siloxane, silazanyl, amino, carbamato, enoxy, imidato, isocyanato, oximato, thioisocyanato, ureido radicals and radicals of the formula,

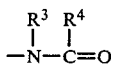

and radicals of the formula,

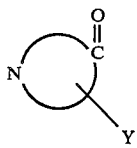

where Y is a radical of the formula,

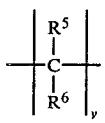

where $R^5$, $R^6$ are individually selected from the class consisting of hydrogen, a $C_{1-12}$ alkyl, alkaryl, alkylester, alkylether, aryl, alkenyl and aralkyl radical, v is a whole number that varies from 2 to 8; $R^3$ is selected from the class consisting of hydrogen and $C_{1-8}$ monovalent hydrocarbon radicals and $R^4$ is selected from $C_{1-8}$ monovalent hydrocarbon radicals.

29. The process of claim 28 wherein the crosslinking silane is methyltrimethoxysilane, the condensation catalyst is selected from the class consisting of dibutyltindiacetate and dibutyltindilaurate, and the during accelerator is selected from the class consisting of di-n-hexylamine and di-n-butylamine.

30. The process of claim 28 wherein the condensation catalyst is selected from the class consisting of dibutyltindiacetate and dibutyltindilaurate and the cure accelerator is selected from the class consisting of di-n-hexylamine and di-n-butylamine.

31. The process of claim 28 wherein R, $R^1$ and $R^2$ are methyl and the tin condensation catalyst is selected from the class consisting of dibutyltindiacetate and dibutyltindilaurate.

32. The process of claim 31 where $R^3$ and $R^4$ are methyl.

* * * * *